(12) United States Patent
Amkreutz

(10) Patent No.: US 6,453,717 B1
(45) Date of Patent: Sep. 24, 2002

(54) BELT INSTALLATION TOOL

(75) Inventor: Frank Amkreutz, Aachen (DE)

(73) Assignee: The Gates Corporation, Denver, CO (US)

(*) Notice: Subject to any disclaimer, the term of this patent is extended or adjusted under 35 U.S.C. 154(b) by 0 days.

(21) Appl. No.: 09/867,933

(22) Filed: May 29, 2001

Related U.S. Application Data

(63) Continuation-in-part of application No. 09/704,903, filed on Nov. 2, 2000.

(51) Int. Cl.[7] .................................................. B21D 53/00
(52) U.S. Cl. ...................................... 72/379.2; 464/130
(58) Field of Search ........................... 72/379.2; 474/130

(56) References Cited

U.S. PATENT DOCUMENTS

| | | | | |
|---|---|---|---|---|
| 2,475,459 A | * | 7/1949 | Pendleton et al. | 464/130 |
| 4,109,544 A | | 8/1978 | Clark | 74/242.7 |
| 4,111,063 A | | 9/1978 | Journey | 74/242.6 |
| 4,193,310 A | | 3/1980 | Boyer et al. | 74/230.3 |
| 4,325,703 A | | 4/1982 | Phillips | 474/130 |
| 4,765,172 A | * | 8/1988 | Seesse et al. | 72/379.2 |
| 5,318,479 A | | 6/1994 | Lawroski | 474/130 |
| 6,033,331 A | | 3/2000 | Winninger et al. | 474/260 |

FOREIGN PATENT DOCUMENTS

| | | | |
|---|---|---|---|
| DE | 12521 | 5/1880 | |
| DE | 42949 | 4/1888 | |
| DE | 54553 | 12/1890 | |
| DE | 153307 | 7/1904 | |
| DE | 161708 | 7/1905 | |
| EP | 0 831247 | 3/1998 | ............ F16G/5/20 |
| FR | 8372 | 3/1908 | |

* cited by examiner

*Primary Examiner*—Lowell A. Larson
(74) *Attorney, Agent, or Firm*—J. A. Thurnau, Esq.; C. H. Castleman, Esq.; S. G. Austin, Esq.

(57) ABSTRACT

The invention comprises a belt installation tool for installing a belt on a pulley. The tool comprises a plurality of segments. The segments and the headpiece are connected by a flexible connector with a headpiece attached to one end of the string of segments. Each segment comprises a belt bearing surface and a lip for engaging a pulley rim, thereby conforming to the curve of the pulley rim. The belt bearing surface describes a tapered surface. A surface normal to the belt bearing surface on each segment urges a belt from the tool onto a pulley as the pulley is turned.

4 Claims, 6 Drawing Sheets

BELT INSTALLATION TOOL

REFERENCE TO RELATED APPLICATIONS

This application is a continuation-in-part U.S. application Ser. No. 09/704,903 filed Nov. 2, 2000.

FIELD OF THE INVENTION

The invention relates to power transmission belt installation tools and more particularly to belt installation tools having a plurality of flexibly connected segments for engaging a pulley and each segment having a belt bearing surface whereby a flexible belt is progressively guided onto a pulley or idler.

BACKGROUND OF THE INVENTION

Belt drive systems comprise a significant and widely used form of mechanical power transmission. Generally a belt runs between two or more pulleys or idlers, more particularly a driver and driven pulley and/or an idler or idlers.

In order to efficiently transmit power between the driver and driven pulleys the belt is installed with a predetermined preload or tension. The amount of tension is generally a function of the horsepower and torque requirements of the drive. Increased horsepower or torque requirements will generally require a commensurate increase in the belt tension.

In order to achieve the proper tension, one or more of the pulleys is loosened so the shaft or shafts can be moved to allow a slack condition in the belt. Then, the belt is looped over the pulleys. The loosened pulley or pulleys are then pulled or tightened into a predetermined position, resulting in a tension being created in the belt. This process requires the pulley(s) to be mechanically adjusted in order to properly preload the belt.

Belts may be installed on pulley systems using other methods. For systems with an automatic tensioning device or tensioner, the tensioner is set, the belt is placed over the tensioner, and the tensioner is then released to move to its operational location, thereby tensioning the belt.

For belt systems without a tensioner, a belt is wrapped around the pulley(s) and then a pulley is tightened in its final location by a bracket, bolt or similar device.

Another method of installing a belt involves use of a tool that presses the belt into a pulley groove without mechanically adjusting the pulleys. The tool is used adjacent to a pulley. As the pulley is turned the tool stretches the belt while laterally forcing it into a pulley groove.

Representative of the prior art is European Patent No. 0 831 247 B1 to Hutchinson which discloses a tool having a radial thrust area resting against a girth of the pulley, keeping a belt away from a pulley until it reaches a plane spaced from a pulley surface. The belt is then forced into the pulley groove.

Also representative of the art is U.S. Pat. No. 4,193,310 (1980) to Boyer et al. which discloses a pulley having a diverging means extending radially and laterally from the rim for engaging and seating the belt on the pulley rim. This invention does not comprise a bearing surface for gradually entraining a belt on a pulley, instead having a peg that abruptly bends the belt into the pulley groove.

The prior art device forces a belt to bend over small radius portions of the tool, causing high stress concentrations that damage the belt during installation. Further, as the belt is forced into the groove, high lateral loads damage the sidewalls of the belt. Finally, the transverse motion of the belt as it moves into the pulley groove may damage the belt ribs.

What is needed is a belt installation tool having a plurality of segments engaging a pulley rim. What is needed is a belt installation tool having flexibly connected segments. What is needed is a belt installation tool having segments together comprising an arcuate belt bearing surface. What is needed is a belt installation tool having a plurality of segments each having a surface substantially normal to the belt bearing surface for urging a belt into a pulley groove. The present invention meets these needs.

SUMMARY OF THE INVENTION

The primary aspect of the invention is to provide a belt installation tool having a plurality of segments engaging a pulley rim.

Another aspect of the invention is to provide a belt installation tool having flexibly connected segments.

Another aspect of the invention is to provide a belt installation tool having segments together comprising an arcuate belt bearing surface.

Another aspect of the invention is to provide belt installation tool having a plurality of segments each having a surface substantially normal to the belt bearing surface for urging a belt into a pulley groove.

Other aspects of the invention will be pointed out or made obvious by the following description of the invention and the accompanying drawings.

The invention comprises a belt installation tool for installing a flexible belt on a pulley. The tool comprises a plurality of segments. Each segment comprises a substantially flat belt bearing surface and a lip for engaging a pulley rim. A flexible connector connects the segments with a headpiece flexibly attached to one end of the string of segments. Each adjacent belt bearing surface when assembled together form a substantially arcuate surface having a radius substantially similar to the radius of a pulley. The tool engages a pulley rim, conforming to the curve of the pulley rim. The belt bearing surface describes a tapered belt bearing surface. A surface normal to the belt bearing surface on each segment urges a belt from the tool onto a pulley as the pulley is turned.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
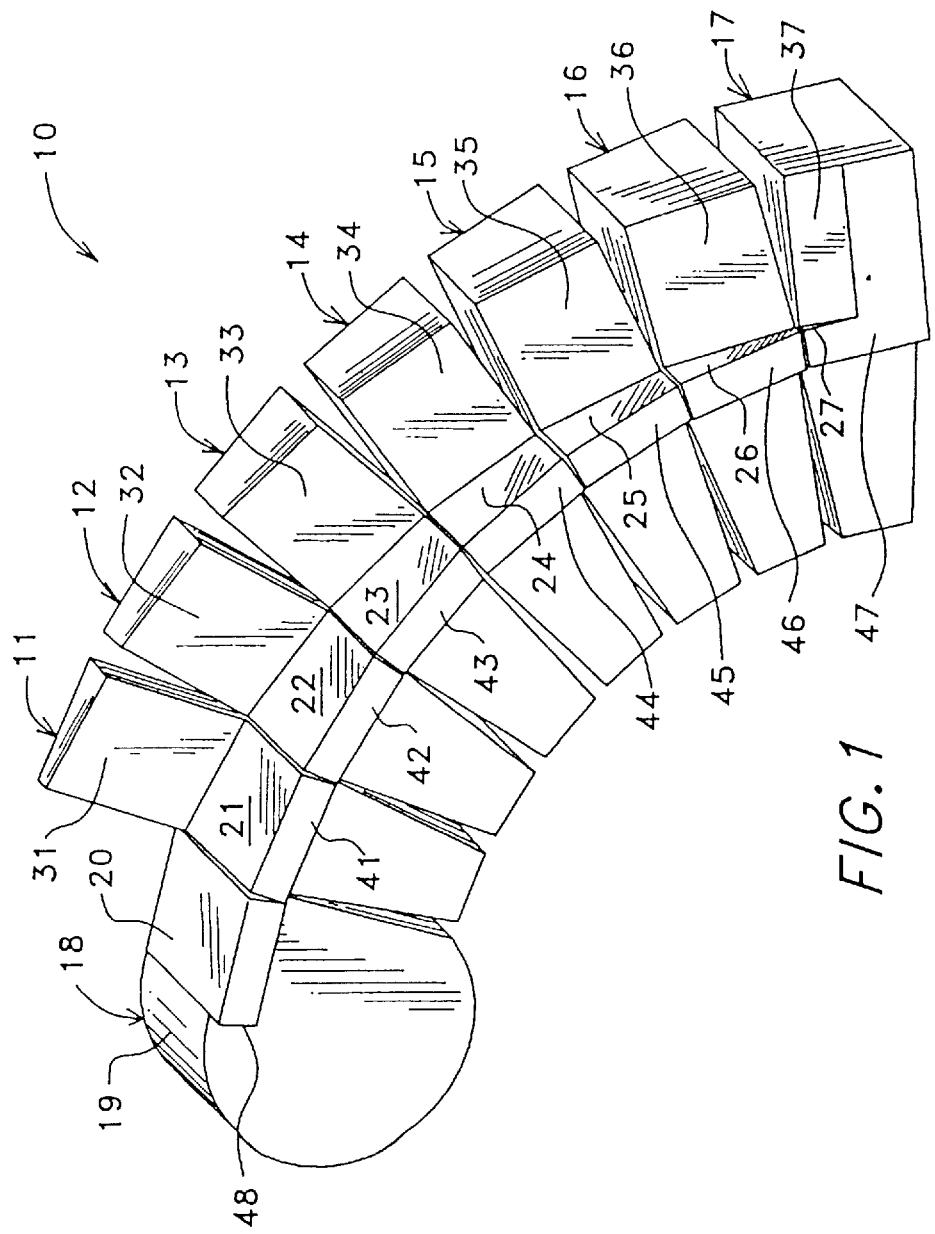
FIG. 1 is an upper side perspective view of the belt installation tool.

FIG. 1 is an upper side perspective view of the belt installation tool. Tool 10 comprises a plurality of segments 11, 12, 13, 14, 15, 16, 17 and headpiece 18. Each segment is moveably connected to each adjacent segment and headpiece 18 is moveably connected to an end of the segment string; each connected to the adjacent component by a flexible connector 30, see FIG. 6. Each segment and the headpiece may comprise a metallic material or a substantially non-metallic material depending upon the needs of a user.

Each segment 11, 12, 13, 14, 15, 16, 17 comprises a belt bearing surface 21, 22, 23, 24, 25, 26, 27, respectively. Each belt bearing surface diminishes in surface area from surface 21 (the largest) to 27 (the smallest), such diminution being a function of an angle, Φ, (see FIG. 5), having an apex at an end opposite the headpiece along an axis of the tool on surface 27, extending from segment 17 (the smallest area) to segment 11 (the largest area). Normal urging surfaces 31, 32, 33, 34, 35, 36, 37 are substantially normal to the respective belt bearing surface for each segment, but may also be set at a slight angle from the normal as required by a user. Surfaces 31 thru 37 gradually urge a belt toward a pulley as the pulley is turned as described elsewhere herein.

Headpiece 18 comprises an arcuate belt bearing surface 19. Arcuate surface 19 is adjacent to bearing surface 20, which is adjacent to belt bearing surface on segment 11. Lips 41, 42, 43, 44, 45, 46, 47, 48 extend from a side of segments 11, 12, 13, 14, 15, 16, 17, and headpiece 18, respectively, on a side of its respective segment opposite the normal surfaces 31, 32, 33, 34, 35, 36, 37, respectively. The lips engage a rim of a pulley, see FIG. 7.

Figure 2:
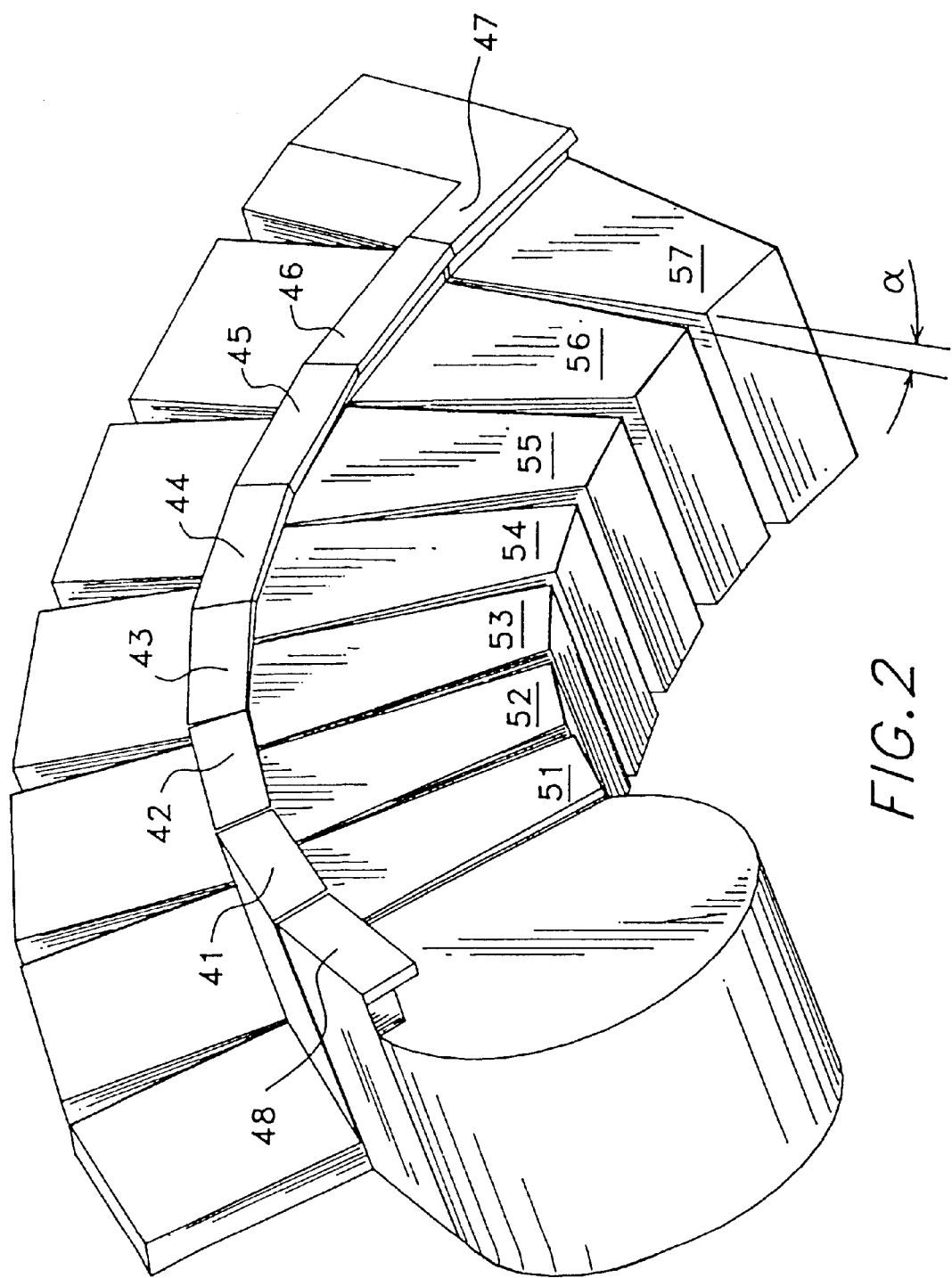
FIG. 2 is a lower side perspective view of the belt installation tool.

FIG. 2 is a lower side perspective view of the belt installation tool. Each segment portion or end 51, 52, 53, 54, 55, 56, 57 is tapered to allow the tool to achieve a curved shape compliant with an outer rim of a wide range of pulleys each having a different radius. The tapered end of each segment creates an angular separation a between adjacent segments that prevents each segment from bearing against each adjacent segment as the tool is wrapped about a pulley rim. This allows the tool to properly conform to the curve of a pulley rim without binding.

Figure 3:
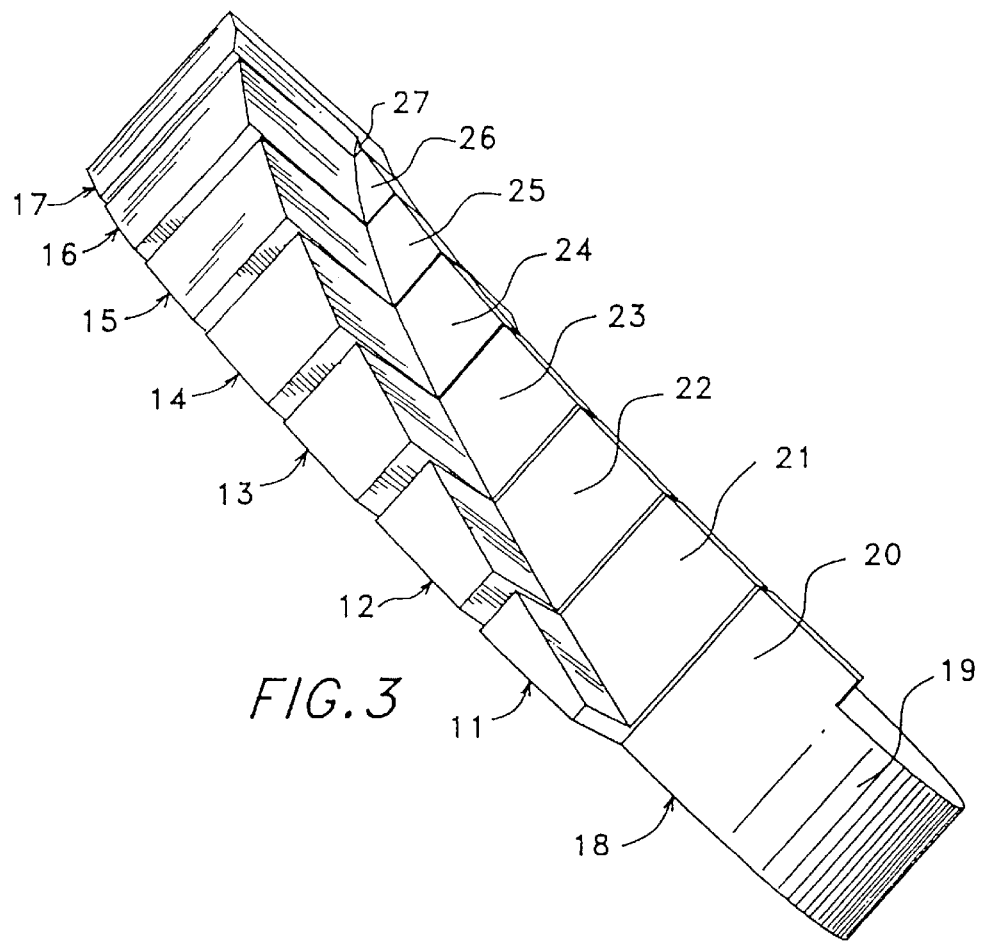
FIG. 3 is a top perspective view of the tool.

FIG. 3 is a top perspective view of the tool. The tapered or tapering nature of the belt bearing surfaces 21, 22, 23, 24, 25, 26, 27 is clearly shown.

Figure 4:
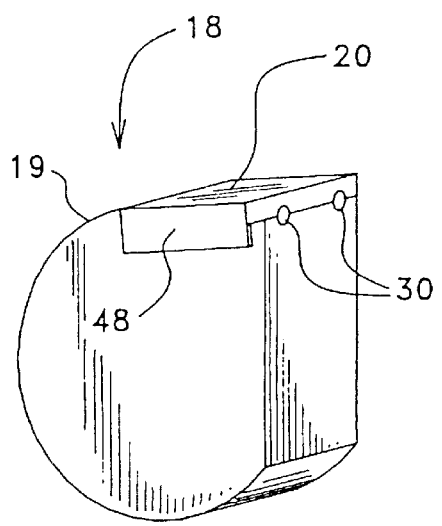
FIG. 4 is a side perspective view of a headpiece.

FIG. 4 is a side perspective view of a headpiece. Flexible connectors 30 are shown clamped under belt bearing surface 20. Surface 20 may be clamped to headpiece 18 by threaded fasteners or any other suitable means known in the art (not shown). Surface 20 may also be integral to headpiece 18. In an alternate embodiment, the flexible connector may be integral to each segment, such as by molding or casting each segment and headpiece about the flexible connector. In yet another alternate embodiment only the end parts, namely headpiece 18 and segment 17, are clamped to the flexible connector 30 with the intervening segments simply slidingly engaged with the flexible connector 30.

Figure 5:
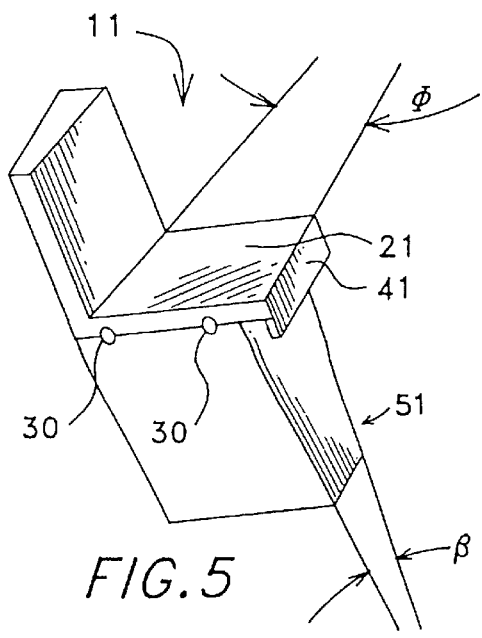
FIG. 5 is a side perspective view of a segment.

FIG. 5 is a side perspective view of a segment. Flexible connectors 30 are shown clamped under surface 21. Flexible connectors 30 may comprise any flexible resilient material known in the art such as metal wire, braided wire, thermoplastic cord, nylon monofilament and the like. Surface 21 may be clamped to segment 11 by threaded fasteners or by any other suitable means known in the art (not shown). Surface 21 and segment 11 may also comprise a single part. Angle Φ describes the tapered nature of the belt bearing surfaces. Angle Φ comprises a range of 5° to 20°.

A tapered lower portion 51 of segment 11 describes angle β having an apex directed toward a center of rotation of a pulley. The tapered end having angle β allows bending engagement of the tool to conform with a rim of a pulley.

Figure 7:
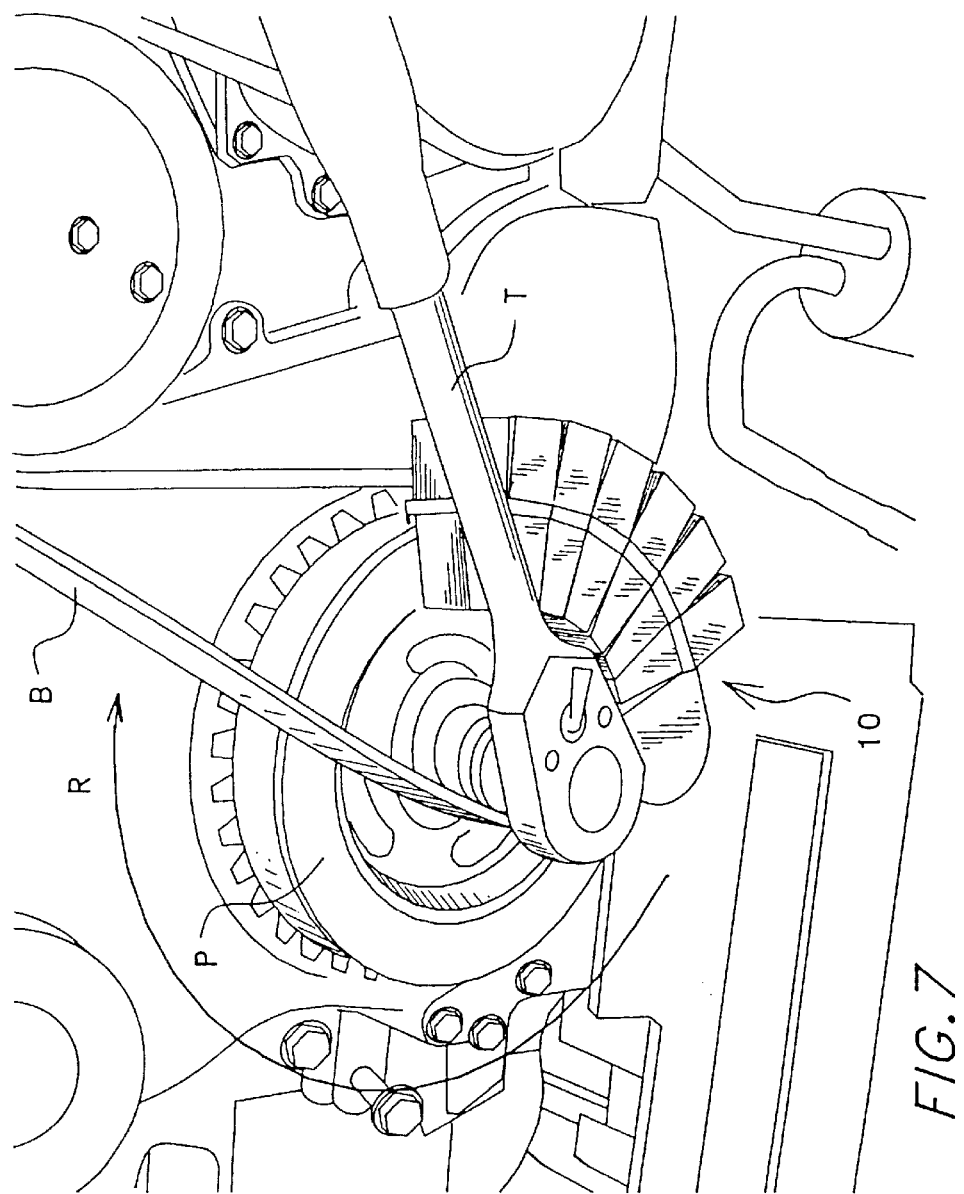
FIG. 7 is a perspective view of the tool engaging a pulley.

Portion 51 also bears upon a pulley side when the tool lip is engaged with a pulley rim (not shown, see FIG. 7).

Segments 12, 13, 14, 15, 16, 17 likewise comprise lower portions 52, 53, 54, 55, 56, 57 respectively, each having a taper as described for portion 51, and each adjacent segment describing the included angle α between them as described in FIG. 2.

In an alternate embodiment, the segments are formed of a plastic or non-metallic material with the flexible connector molded into and between the segments, therefore forming the tool as a single monolithic piece.

Figure 6:
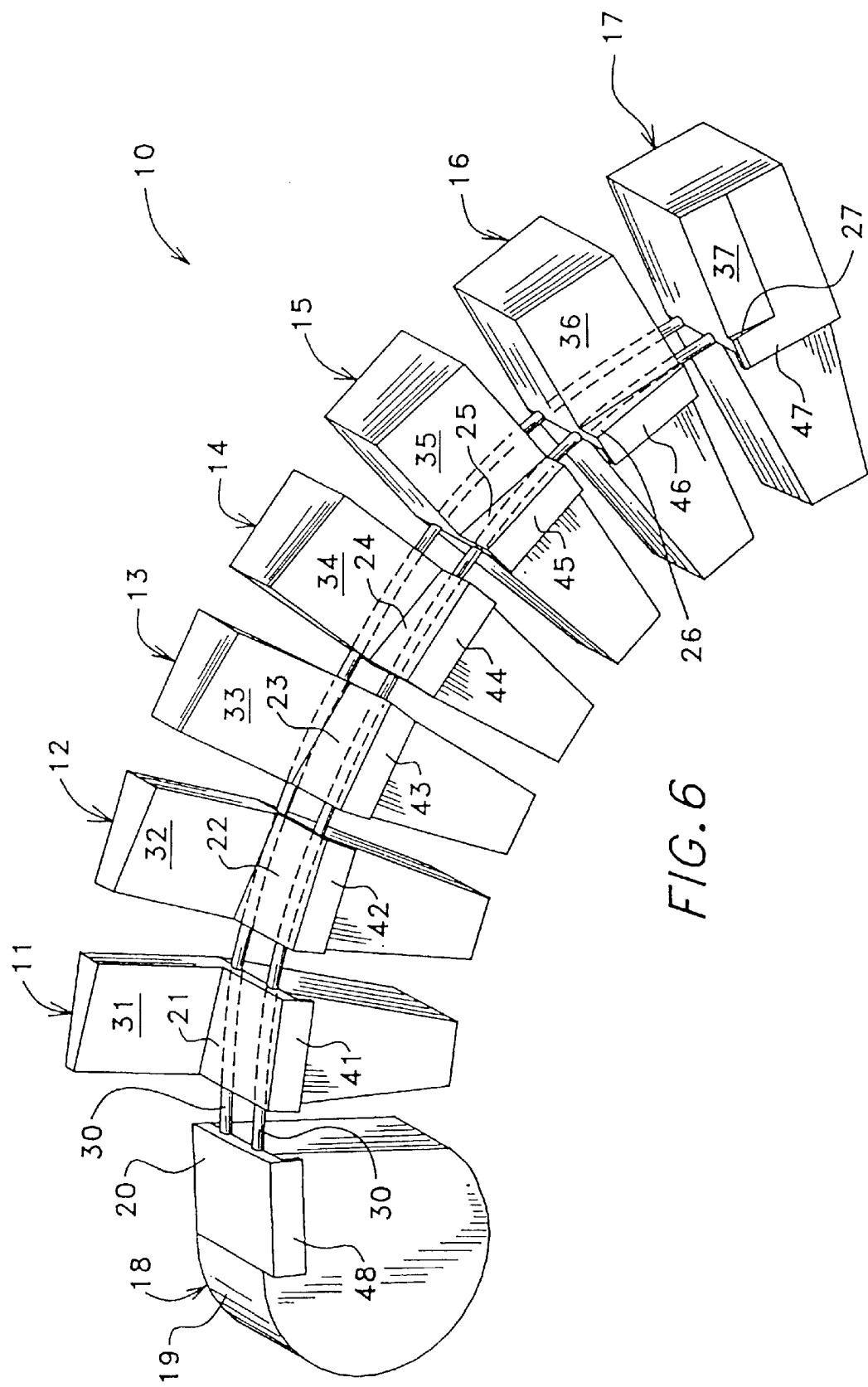
FIG. 6 is a partially exploded view of the tool.

FIG. 6 is a partially exploded view of the tool. Flexible connectors 30 are shown extending between each segment and the headpiece. Each segment flexes about the flexible connector to allow the tool to conform to the arc of a pulley.

FIG. 7 is a perspective view of the tool engaging a pulley. Ratchet tool T is shown engaging a pulley bolt. The pulley is rotated in direction R, thereby mounting the belt B on the pulley as described herein.

In use, the tool 10 is engaged with a pulley P rim with the headpiece lip and each segment lip. A ratchet wrench T, or the like, is then engaged to a pulley bolt or crankshaft bolt used to affix the pulley to the shaft. A belt B to be installed is loosely looped about the pulley and the tool, initially engaging surface 19 of the headpiece 18. As the pulley is turned with a ratchet wrench in direction R, the belt further engages surface 19. As the pulley is turned further, the belt sequentially engages each segment belt bearing surface in turn and in doing so, is progressively moved toward engagement with the pulley by operation of the normal surfaces by acting on the side of the belt. As a full turn of the pulley is completed, the belt fully engages with the pulley and the tool is removed.

Figure 8:
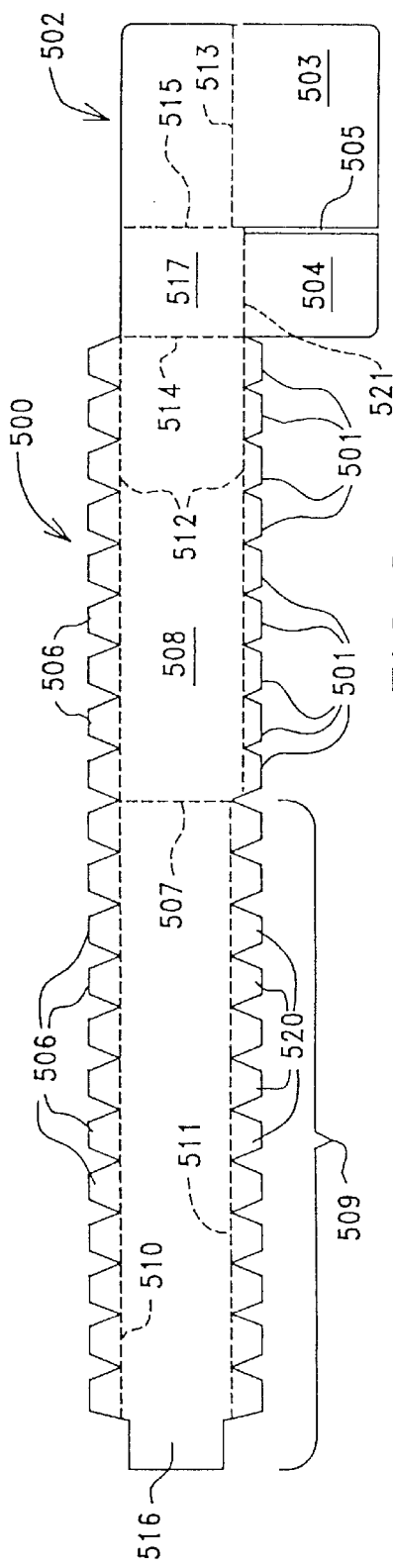
FIG. 8 depicts a plan view of an alternate embodiment.

FIG. 8 depicts a plan view of an alternate embodiment. Alternate embodiment 500 comprises a flat flexible member made of a material subject to being bent into a preferred shape, such as metal. The material having a predetermined flexibility to render it capable of retaining the formed shape. The planar form shown may be fabricated by cutting or stamping.

Figure 9:
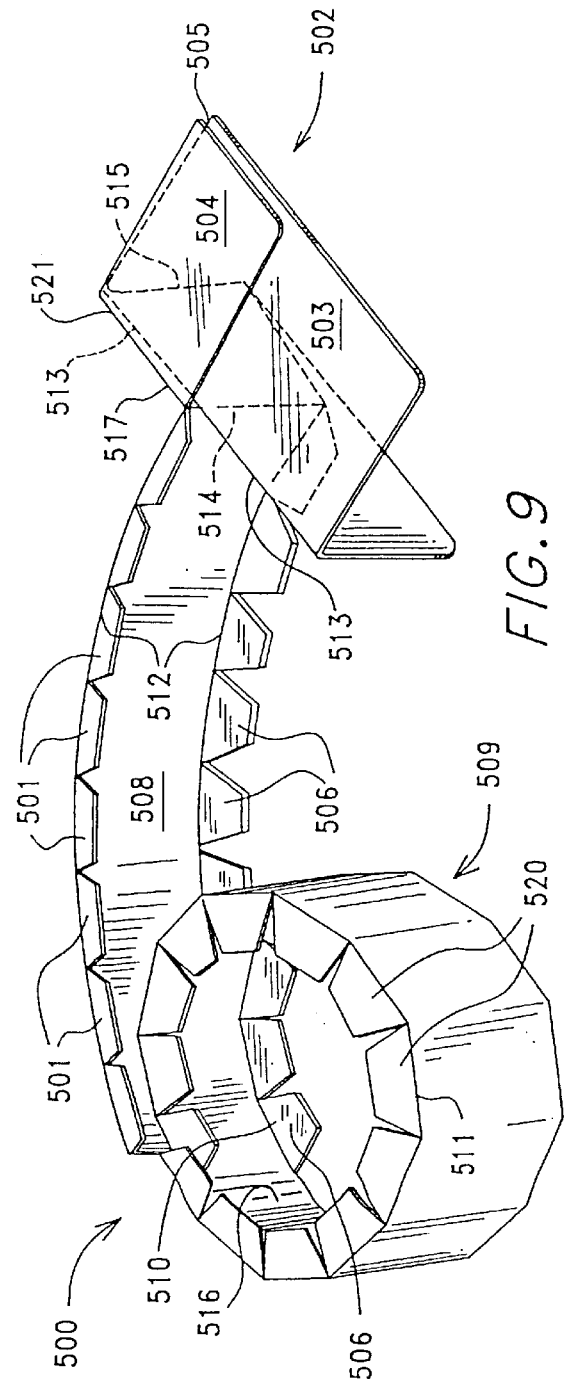
FIG. 9 depicts a perspective view of the alternate embodiment described in FIG. 8.

Tool 500 comprises tabs 501, 506 and 520 as well as beltpiece 502. To form the tool, beltpiece 502 is folded approximately 180° at line 515 in a first direction and then approximately 90° at line 514 in an opposite second direction. Tabs 503 and 504 are then folded approximately 90° on lines 513 and 521 respectively so they are substantially parallel to a major axis of the tool and parallel to a side of a pulley as shown in FIG. 9. Folding results in beltpiece 502 presenting a reinforced planar surface 517 substantially normal to the member belt bearing surface 508. Although in the preferred embodiment of the alternate embodiment surface 517 is substantially normal to surface 508, one can appreciate that any angle between surface 517 and surface 508 sufficient to urge a belt into a pulley groove is acceptable.

Next tabs 501, 506 and 520 on the member first and second opposite edges are folded approximately 90° along lines 510, 511, 512 causing them to be pointed inward. Tabs 510, 506 and 520 have alternate portions of material removed to facilitate rolling body 508. Headpiece 509 is formed by curling or rolling end 516 toward beltpiece 502 along a major axis of the tool. End 516 is rolled until the headpiece has a substantially circular form, up to approximately line 507. One can see from FIG. 8 and FIG. 9 that tabs 520 are slightly recessed from tabs 501, thereby allowing folded tabs 501 to engage a pulley rim (not shown). One can appreciate that the tool is given an overall curved form prior to use on a pulley as shown in FIG. 9.

In use, the tool is engaged with a pulley rim (not shown) using tabs 501. Once the tool is engaged with a pulley rim, beltpiece 502 urges a belt into a pulley groove as the pulley is turned as otherwise disclosed in this specification. Headpiece 509 supports the tool against a pulley side during use allowing beltpiece 502 to urge a belt into a pulley groove.

FIG. 9 depicts a perspective view of the alternate embodiment described in FIG. 8. The substantially curved form of the tool is shown. Headpiece 509 is shown having a curled form to provide reinforcement. The belt bearing surface 508 has a predetermined flexibility allowing the tool to be readily formed to accommodate a wide range of pulley radii.

Although a single form of the invention has been described herein, it will be obvious to those skilled in the art that variations may be made in the construction and relation of parts without departing from the spirit and scope of the invention described herein.

I claim:

1. A method of making a belt installation tool comprising the steps of:

forming a member having a member surface and having opposing ends and having an edge disposed between the opposing ends;

bending an opposing end to form a surface disposed at an angle to the member surface;

bending a portion of the edge to form a pulley engaging rim; and rolling the other opposing end along a portion of a major axis of the member to create a generally circular member portion form.

2. The method as in claim 1 further comprising the steps of:

forming the member having a second edge opposite the edge; and bending the second edge in a like direction to the edge such that a bend line of the edge and a bend line of the second edge are substantially parallel to each other.

3. The method as in claim 2 comprising the step of:

fabricating the member of a metallic material; and removing alternate portions of the first edge and of the second edge to facilitate rolling the member surface into a curved shape.

4. The method as in claim 3 comprising the step of fabricating the member of a material having a predetermined flexibility for conforming the member to a pulley radius.

* * * * *